June 8, 1954     D. EDGAR     2,680,615
PNEUMATIC LEATHER STACKING MACHINE

Filed Feb. 6, 1951     2 Sheets-Sheet 1

Inventor
David Edgar
By his Attorney

June 8, 1954  D. EDGAR  2,680,615
PNEUMATIC LEATHER STACKING MACHINE
Filed Feb. 6, 1951  2 Sheets-Sheet 2
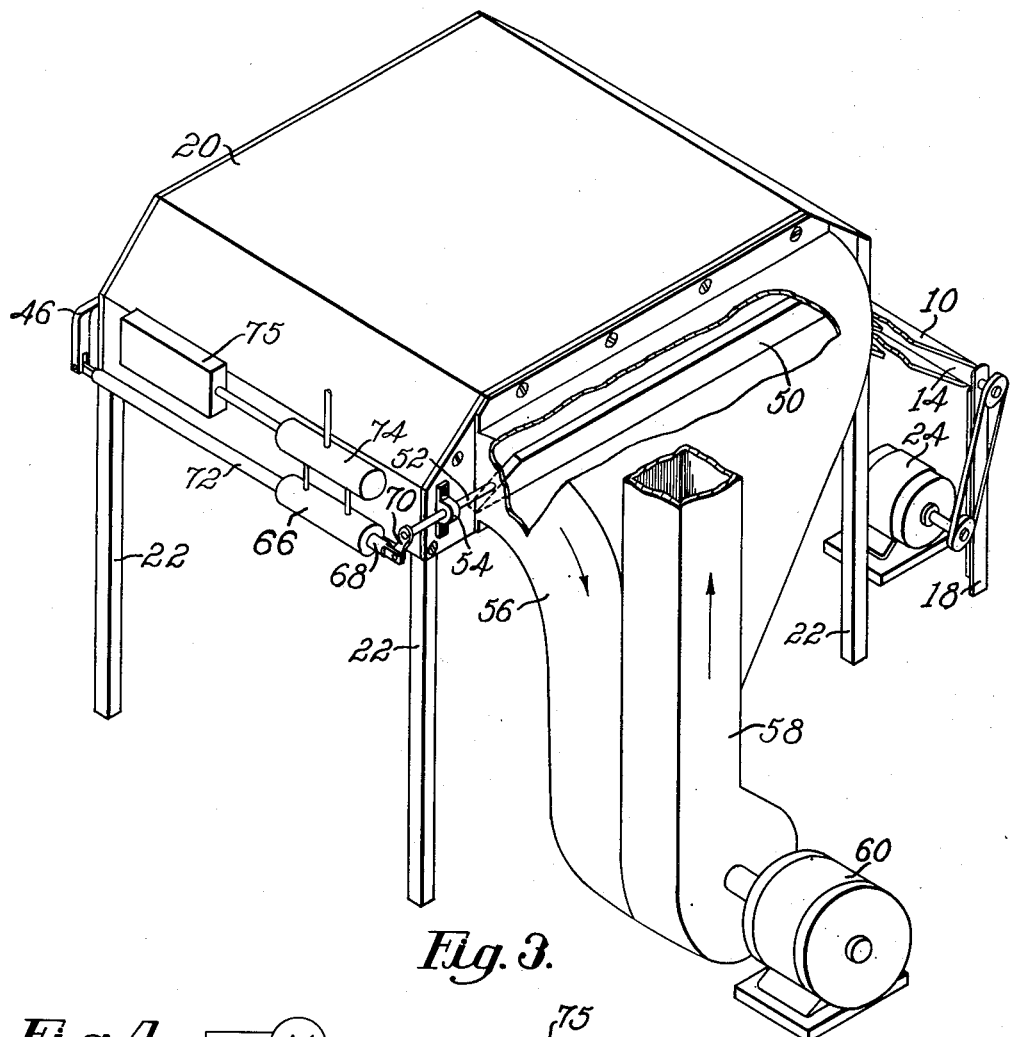
Fig. 3.
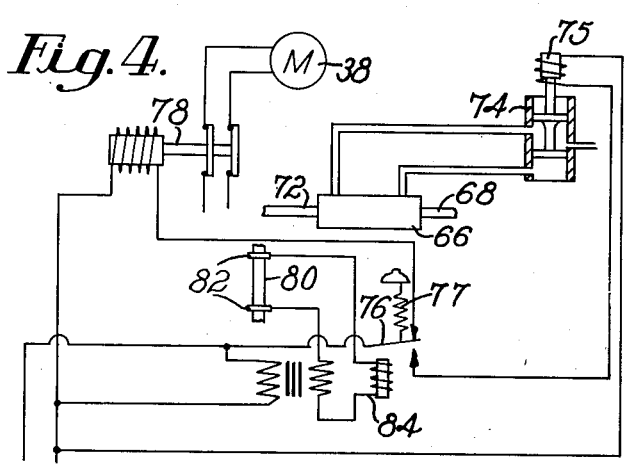
Fig. 4.
Inventor
David Edgar
By his Attorney Patented June 8, 1954

2,680,615

UNITED STATES PATENT OFFICE 2,680,615

PNEUMATIC LEATHER STACKING MACHINE

David Edgar, Lynn, Mass., assignor to United Shoe Machinery Corporation, Flemington, N. J., a corporation of New Jersey Application February 6, 1951, Serial No. 209,634

1 Claim. (Cl. 271—74)

This invention relates to means for feeding and discharging individual work pieces of sheet material, and is more particularly concerned with a pneumatic mechanism for conveying hides or skins and automatically stacking them consecutively upon discharge at an unloading station. While herein illustrated with reference to a machine for stacking leather, it will be recognized that the invention in its several aspects is not so limited in application but comprises features adaptable to enterprises involving the handling of workpieces of different character.

On being discharged after treatment in a leather working machine a hide or skin usually is an especially cumbersome, awkward and unwieldy object to manage. The hides or skins are of very irregular shape and their individual conditions may vary considerably being, for example, stiff or flaccid, heavy or light, and slippery or tacky. If the workpieces be allowed to fall and accumulate in random fashion on the floor upon their release from a machine they invariably become soiled and/or creased, and it is thereafter doubly difficult further to handle and process the individual pieces. Manually to receive and tend each workpiece as it comes from a machine being fed intermittently is obviously a time-consuming, costly, and disagreeable task.

In view of the circumstances just mentioned it is a primary object of this invention to provide an improved, relatively compact machine of pneumatic type for removing hides or skins as they are consecutively presented and automatically stacking them upon a platform or horse for convenient storage or subsequent disposition.

Pursuant to this object a feature of the invention resides in the provision of a permeable work carrier, suction means acting on the carrier to support a workpiece, mechanism for moving the carrier to transfer the workpiece to an unloading zone or station, a damper associated with said means for releasing the workpiece from the carrier, and automatic control means for said damper and said mechanism, said control means being actuated by the passage of the workpiece to said carrier whereby the suction means is made temporarily effective and said mechanism is simultaneously rendered temporarily operative to transfer the workpiece to said station.

The above and other features of the invention, together with novel arrangements and details of parts, will now be more fully described in connection with one embodiment, reference being had to the accompanying drawings, in which:

Fig. 3 is a perspective of the machine viewed, in relation to Fig. 1, as being turned 180° about a vertical axis, i. e., the in-feed side of the machine being shown in rearward position and the suction apparatus being shown toward the front; and Fig. 4 is a wiring diagram of the operating control circuits.

Figures 1, 2:
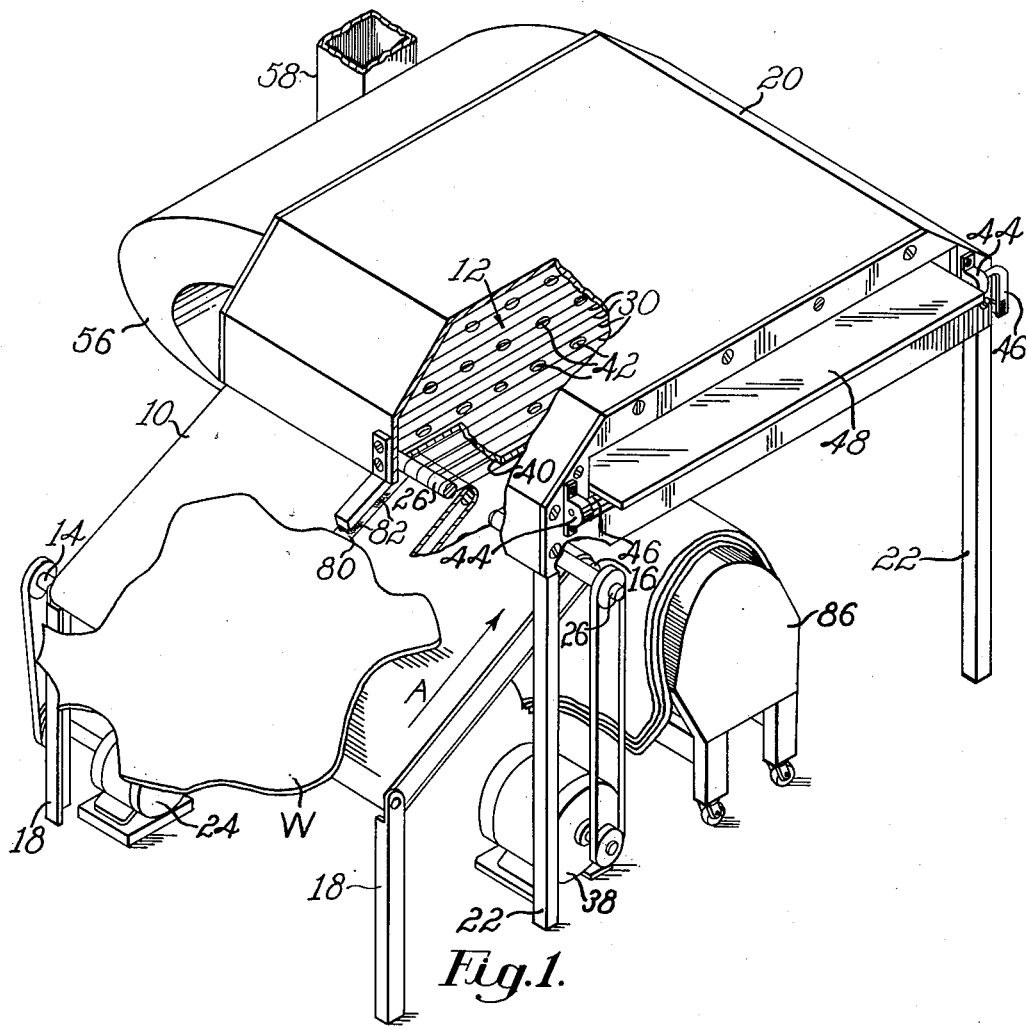
Fig. 1 is a perspective of a machine illustrative of the invention, the in-feed side of the machine being toward the front and shown with a portion broken away to reveal internal construction details.
Fig. 2 is a vertical section of a portion of the machine seen in Fig. 1 and showing a workpiece at its unloading station.

The illustrative machine comprises external transfer and loading means in the form of an endless conveyor belt 10 arranged substantially in tandem with an internally disposed work carrier generally designated 12. The belt 10 is rotatably mounted on roller shafts 14 and 16, the shaft 14 having a bearing in each of the upper ends of a pair of standards 18, and the shaft 16 being rotatably supported by bearings formed in a rectangular chamber or housing 20 enclosing the work carrier 12. The housing 20 is adapted to accommodate the largest workpiece when spread out and is secured at each of its four corners to an upright support 22. A motor 24 has belt and pulley driving connection with one end of the shaft 14 for the purpose of moving the belt 10 in the direction indicated by the arrow A of Fig. 1.

The work carrier 12 is horizontally disposed within the housing 20, the latter affording rotatable mounting for a pair of terminal rollers 26, 28 extending widthwise in the housing. Endless parallel wires 30 are spaced widthwise of the rollers 26, 28, preferably about ¾ of an inch apart, and being in engagement therewith, partake of their rotation. The wires are stretched sufficiently taut to maintain their operative relation with the rollers 26, 28 and to provide a generally flat, work-engaging plane or zone 32 on their under or external side. Means for maintaining the wires 30 in parallel paths may be provided as, for example, by respectively running them in circumferential grooves formed in the rollers 26, 28. The plane 32 is substantially tangent to the upper portion of the belt 10. For the purpose of making the zone between the housing 20 and the belt 10 air tight, or as nearly so as may be readily practicable, a flexible tab or flap 34 (Fig. 2) secured along an inner side of the housing 20 extends over the entire width of the upper end of the belt 10 and intersects the plane 32. The flap 34 also aids in spreading and smoothing a workpiece as it is fed into the plane 32. For driving the work carrier 12 in a direction to move the lower lengths of the work engaging wires 30 along a path away from the belt 10, a motor 38 is provided having belt and pulley connection with the shaft 26. Operation of the motor 38 is controlled as hereinafter described.

As best seen in Figs. 1 and 2 a perforated, horizontal plate 40 extending between the rolls 26 and 28 is supported by opposite sides of the housing 20 and is located above but closely adjacent to the zone 32 and is between the upper and lower strands of wire 30. In effect the plate 40 constitutes, at times, a bottom closure for the housing 20 as will hereinafter be described. Apertures 42 in the plate 40 are positioned within a space having the general configuration of an average size workpiece. The spacing of the apertures 42, as well as their size and number, is selected with regard to the nature of the sheet material being handled, the relative air tightness of the housing 20, and the capacity of air suction mechanism about to be described. Rotatably mounted in brackets 44 (Fig. 1) affixed to one side of the housing 20 is a shaft 46 supporting a venting damper 48 adapted to cover or uncover an opening in the housing.

Referring to Fig. 3, a controlling damper 50 is arranged to operate in that side of the housing opposite from the venting damper 48, the damper 50 being rotatably mounted on a shaft 52 having bearings in brackets 54 (only one being shown). A down draft duct 56 encompassing the damper 50 extends from the housing 20 and merges with an exhaust blower housing 58. A motor 60 is provided for operating an exhaust blower (not shown) within the housing 58 and effective, when the damper 48 is closed, to reduce the air pressure within the housing.

Coming now to the automatic operating controls for coordinating the work feeding mechanism and work release or suction means, attention is invited to both Figs. 3 and 4. An air cylinder 66 is provided with a piston (not shown) reciprocable therein and having operative connections with the damper shafts 46, 52. A connecting rod 68 extending from one side of the piston is pivotally connected to a crank arm 70 affixed to the shaft 52 while a rod 72 extends from the other side of the piston for pivotal connection with a curved crank end portion of the shaft 46. The arrangement is such that introduction of fluid pressure to one side or the other of said piston, as regulated by a solenoid valve 74, is effective to shift the rods 68, 72 and thereby simultaneously open the control damper 50 while the venting damper 48 is being closed, or vice versa. The solenoid valve 74 is shown in Fig. 4 with its solenoid 75 in its normal deenergized condition, an interrupter switch 76 then being operative under the influence of a spring 77 to close a circuit through a relay 78 governing operation of the motor 38. Automatic means are provided for shifting the switch 76, after an appropriate interval of work feeding via the carrier 12, whereby the motor 38 is made inoperative by its relay 78 to stop the carrier, and the solenoid 75 is simultaneously energized to actuate both dampers for release of the work as will be described. For this purpose work detector means in the form of an endless flexible conductor strip 80 (Fig. 1) is secured to a median portion of the conveyor belt 10 and normally (when no portion of a workpiece is positioned to interrupt the circuit) is continuously in electrical contact with a pair of alined detector brushes 82, one of which is disposed adjacent to an entrance to the work carrier 12 in an interrupter circuit including a solenoid 84 that is arranged, when energized, to actuate the switch 76.

In operating the machine a horse 86 (Fig. 1) or platform of some type for receiving stacked hides or skins will first be stationed beneath the housing 20 and preferably centered beneath the zone 32. It will be apparent that the loading or receiving end of the conveyor belt 10 may be suitably adjusted heightwise together with the motor 24 for accommodating the delivery output of a through-feed or other leather treating machine. The motors 24 and 60 are operated continuously to drive the belt 10 and exhaust means, respectively. In contrast thereto the motor 38 is normally not operating but drives the carrier 12 only during the interval when a workpiece is being conveyed under one or both of the brushes 82. Thus the carrier 12 starts operation when the leading edge of the work first passes under a brush 82 and its operation stops almost immediately after the trailing edge advances into the housing 20 and permits the second brush 82 to reestablish the interrupter circuit via the strip 80. Closing of the latter circuit energizes the solenoid 84 to shift the switch 76 against resistance of the spring 77. The shifted switch terminates flow of current in the circuit governing the motor 38 so that the latter comes to rest as all portions of the workpiece are located in the housing 20 and halted for release above the horse 86. Also, the shifted switch 76 closes the circuit energizing the solenoid 75 thereby actuating the valve 74 to effect movement by fluid pressure of the piston within the air cylinder 66. As a result of the consequent shifting of the connections 68, 72, the venting damper 48 is opened and the control damper 50 is closed to effect work release.

It should be pointed out that during work transfer and prior to the just described work releasing movement of the dampers, they have cooperated with the workpiece W, the flap 34, and the plate 40 to enable the motor 60 effectively to reduce pressure above the workpiece by exhausting air from the upper portions of the housing 20 via the open damper 50. Air is of course drawn into the housing primarily through the uncovered plate apertures 42 and partially through those plate apertures nearly sealed by the workpiece. There results a differential in fluid pressure acting on the lower and upper sides of the workpiece. It is accordingly drawn upwardly to be held against the moving wires 30 and close to the plate 40 by the suction effect created thereunder. Preferably the diameter and tautness of the wires 30 is such as to permit the work to advance in close proximity to the apertures 42 to enhance the work supporting effect of the suction. The advancing workpiece comes to rest when it has, to a large extent, sealed off the bottom of the housing and the damper action above described then serves quickly to restore atmospheric pressure therein so that the workpiece is automatically released to fall by gravity and in spread-out condition onto the horse 86 or other workpiece previously stacked and smoothly deposited thereon.

On release of the workpiece from the housing 20 the carrier 12 and motor 38 remain inoperative until a succeeding workpiece passes under a brush 82 deenergizing the solenoid 84 and permitting the switch 76 to be shifted by the spring 77 so as to close the circuit for operating the motor 38. Such movement of the switch 76 deenergizes the solenoid 75 again to shift the valve 74 and consequently the piston in the air cylinder 66. The connections 68, 72 now move simultaneously to open the damper 50 and close the venting damper 48 thereby advantageously enabling the suction and work transferring means to resume effective operation only for the required time interval.

From the above description it will be appreciated that a stacking machine for hides and skins, or the like, has been provided which will function without the aid of an operator and which comprises carrying means requiring but little operating power.

It is desirable to avoid turbulent air currents between the release or unloading position of the hides or skins and the horse 86 since such currents, emanating from sources exterior to the machine, may prevent vertical falling or regular stacking and, if the height of fall be great, even cause a workpiece to glide sidewise to an undesirable degree. In this connection, if required, current deflecting aprons, (not shown) may be advantageously suspended from the sides of the housing 20.

Having described my invention, what I claim as new and desire to secure by Letters Patent of the United States is:

A pneumatic machine for stacking hides and skins having, in combination, a transfer conveyor for presenting consecutive work pieces to said machine, means for continuously operating said conveyor, a rigid housing mounted adjacent to said transfer conveyor having its bottom portion open, a rigid perforated member mounted in said bottom portion of the housing, a conveyor of vapor permeable construction mounted in said housing and having its lower run contiguous to the lowermost surface of the perforated member and having one end thereof in operative relation to the transfer conveyor, means for reducing the pressure in the zone encompassed by the housing and perforated plate, a first damper for controlling the effectiveness of the pressure reducing means, a second damper in the housing for opening said zone to the atmosphere, means for simultaneously opening said first damper and closing said second damper allowing said zone to be evacuated, means for intermittently operating the vapor permeable conveyor, work detector means mounted on the transfer conveyor and adjacent to the vapor permeable conveyor, said detector means being arranged when contacted by a work piece to actuate the vapor permeable conveyor operating means and simultaneously to actuate the damper control means whereby said zone is evacuated so that the work piece is carried by the vapor permeable conveyor across the bottom surface of said perforated plate over a work deposit area, said detector means likewise being arranged when the work piece passes beyond it simultaneously to inactivate the vapor permeable conveyor operating means and cause the damper control means to reverse the positions of the dampers causing the evacuated zone to be opened to the atmosphere allowing the work piece to fall onto a work support in the work deposit area.

References Cited in the file of this patent

UNITED STATES PATENTS

| Number | Name | Date |
|---|---|---|
| 2,462,439 | Thompson | Feb. 26, 1949 |
| 2,486,196 | Nebolsine | Oct 25, 1949 |
| 2,517,388 | Daves | Aug. 1, 1950 |
| 2,572,472 | Griffin | Oct. 23, 1951 |
| 2,566,240 | Mursch | Aug. 28, 1951 |